United States Patent [19]

Hancock

[11] Patent Number: 5,789,884
[45] Date of Patent: Aug. 4, 1998

[54] CONTROL ARRANGEMENT FOR MOTORISED TROLLEY

[76] Inventor: Frank John Thompson Hancock, Oak Brow, Serotina, Beechfield Road, Alderley Edge, Macclesfield, Cheshire SK9 7AT, United Kingdom

[21] Appl. No.: 683,055

[22] Filed: Jul. 16, 1996

Related U.S. Application Data

[63] Continuation-in-part of Ser. No. 624,019, Mar. 25, 1996, abandoned.

[51] Int. Cl.$^6$ .................... G05G 7/00; B62D 51/04; B60K 27/06
[52] U.S. Cl. .............. 318/280; 318/139; 318/587; 318/630; 318/640
[58] Field of Search ................... 318/138, 139, 318/280, 284, 546, 374, 560–696; 180/98, 19.3, 6.5, 65.5, 332; 338/128, 32 H, 32 R; 200/6 A, 5 R, 404; 280/43.1, DIG. 5, 42, 652; 250/221, 229; 74/471 XY; 335/207; 137/554, 607

[56] References Cited

U.S. PATENT DOCUMENTS

| | | | |
|---|---|---|---|
| 3,735,224 | 5/1973 | Bachofer et al. | 318/284 |
| 3,812,929 | 5/1974 | Farque | 180/98 |
| 3,976,151 | 8/1976 | Farque . | |
| 4,489,303 | 12/1984 | Martin | 338/128 |
| 4,570,731 | 2/1986 | Oaks | 180/19.3 |
| 4,639,667 | 1/1987 | Andresen | 324/208 |
| 4,733,214 | 3/1988 | Andersen | 338/128 |
| 4,795,862 | 1/1989 | Linden | 200/6 A |
| 4,825,157 | 4/1989 | Mikan | 324/208 |
| 4,868,530 | 9/1989 | Ahs | 200/404 |
| 5,293,900 | 3/1994 | Karbassi et al. | 137/554 |
| 5,350,075 | 9/1994 | Kahlman | 200/6 A |
| 5,421,694 | 6/1995 | Baker et al. | 414/694 |
| 5,496,048 | 3/1996 | Adam | 280/42 |
| 5,526,889 | 6/1996 | Neary | 180/6.66 |
| 5,532,476 | 7/1996 | Mikan | 250/221 |
| 5,540,296 | 7/1996 | Strothmann | 180/19.3 |
| 5,552,988 | 9/1996 | Kawaguchi et al. | 364/426.01 |

FOREIGN PATENT DOCUMENTS

| | | |
|---|---|---|
| 0575700 | 12/1993 | European Pat. Off. . |
| WO 95/03096 | 2/1995 | Germany . |
| 9311075 U | 12/1995 | Germany . |
| 2285852 | 7/1995 | United Kingdom . |

OTHER PUBLICATIONS

Patent Abstracts of Japan; Publication No. 60096102, Publication Date May 29, 1985; Application No. 58199248, Application Date Oct. 26, 1983; Japanese National Railways; Kitayama Toshikazu.

Patent Abstracts of Japan; Publication No. 07123529, Publication Date May 12, 1995; Application No. 05260538, Application Date Oct. 19, 1993; Kubota Corp.; Goto Yoshiake.

Bailey, Ronald B and Williamson, Dennis F.; "A Modern Chopper Propulsion System For Rapid Transit Application With High Regeneration Capability"; 8095 IEEE Trans. Ind. Applic.; vol. IA-14, No. 6 (1978 11/12).

*Primary Examiner*—Paul Ip
*Attorney, Agent, or Firm*—John R. Ley; John B. Phillips

[57] ABSTRACT

A control arrangement for a motorised trolley having a handle by which to control a driving motor which propels the trolley. The handle works a transducer which supplies a control signal for the driving motor. Then handle has limited movement relative to the trolley in the fore and aft direction but is stiffly connected to the trolley in the vertical and lateral direction whereby the trolley can be manually controlled by the handle in pitch and yaw by the pedestrian operating the trolley. The motor is controlled in a proportional or integral manner to accelerate, to decelerate, or to maintain a constant (cruise) velocity of the trolley. The acceleration, deceleration and velocity maintenance are achieved by ramping and constant voltages applied, preferably by a microprocessor-based control system, to a D.C. shunt motor which drives one or more wheels of the trolley.

32 Claims, 3 Drawing Sheets

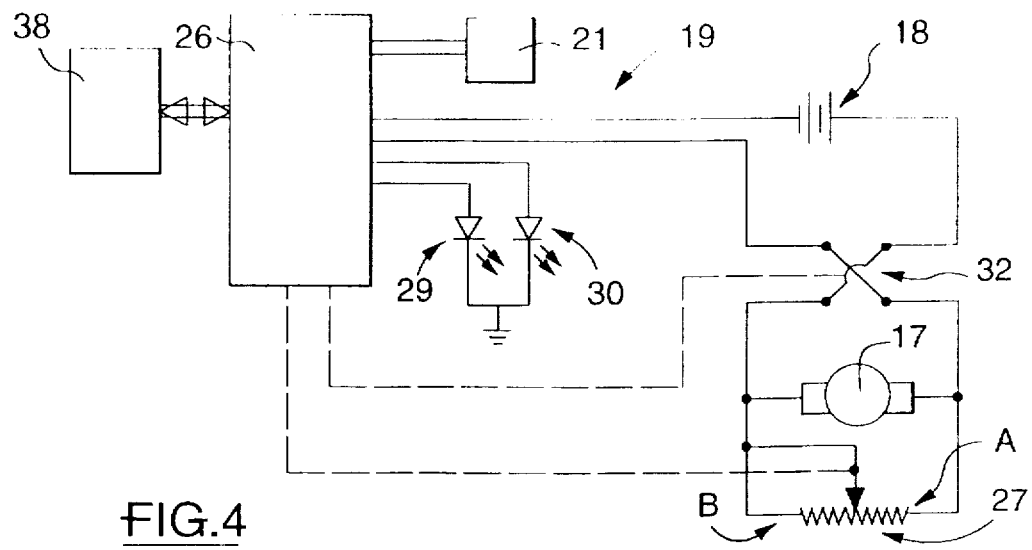
FIG.4
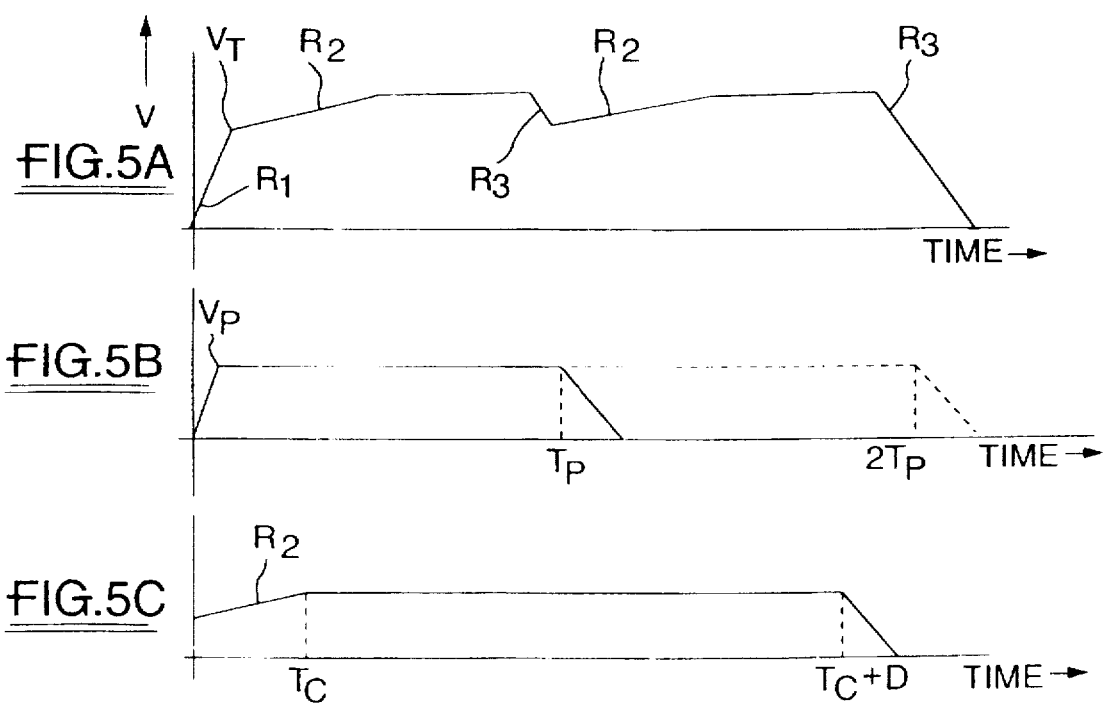
FIG.5A
FIG.5B
FIG.5C

CONTROL ARRANGEMENT FOR MOTORISED TROLLEY

CROSS REFERENCE TO RELATED APPLICATION

This is a continuation-in-part application of U.S. patent application for "CONTROL ARRANGEMENT", Ser. No. 08/624,019, filed Mar. 25, 1996, now abandoned.

INTRODUCTION

This invention relates to a control arrangement particularly for trolleys, more particularly, for two- or three-wheeled, motorised trolleys such as golf trolleys or caddies.

BACKGROUND OF THE INVENTION

Numerous arrangements have been proposed, and some of them realised, for the control of motorised trolleys, by which is meant motorised vehicles which move at walking pace, controlled by a pedestrian. Most such arrangements involve a handle which features control arrangements. The trolleys are essentially self-supporting, having two, three or four wheels, of which at least one is steerable and steering is effected by the handle, which may have a rotatable or extensible components to control the motor speed.

SUMMARY OF THE INVENTION

The present invention provides control arrangements which can be realised less expensively and which can be set up to maximise range and optimise performance through efficient power management.

The invention comprises a control arrangement for a trolley having a handle by which a driving motor is controlled, the handle working a transducer providing control signaling for said motor and having limited movement relative to the trolley in the fore and aft direction but being stiffly connected to the trolley in the vertical and lateral directions whereby the trolley can be manually controlled by the handle in pitch and yaw.

The handle may have a first part fixed to the trolley and carrying a second part having said limited movements relative to the first part. Said second part may be carried on said first part by parallel leaf springs forming a parallelogram linkage affording said limited movement.

Said second part may comprise a grip mounted on a shaft by flexible mount means, which may comprise elastic discs, which may be of fabric reinforced elastomer. The shaft may be mounted in a plug insertable into the said first part.

The transducer may comprise a Hall effect device and magnet, or a rheostat or a microswitch with pulse integrating device or indeed any other suitably robust and responsive device, and may be connected to a motor controller to control the motor for example proportionally or in accordance with a signal indicative of the separation between the first and second parts of the handle, and also with a derivative term so as to power the motor to drive the trolley forwardly so as to tend to maintain a predetermined separation corresponding to a small pulling force on the handle, whatever the acceleration/deceleration imparted to the operator.

To cope better with gradients and maintain a constant load on the user's arm under varying circumstances of gradient, load or speed, the motor controller can utilise a term which corresponds to an integral of the separation over a selected time period.

The transducer may also comprise a switch biassed to one of two or three positions which on operation of the handle to move or push the trolley along actuates a controller to ramp up motor voltage in a predetermined fashion and when the switch returns under its bias to its position indicating lack of demand for further acceleration actuates the controller to ramp down the motor voltage.

The trolley may be arranged to be just pulled or just pushed, in which case a two-position switch having on and off states may be used. However, the trolley may be arranged to be pulled or pushed at will in which case a three-position switch arrangement biassed to the centre position could be used. Such three-position switch arrangement could be constituted by two opposed micro switches.

The operation of the switch with the trolley at rest may first remove a motor shunt, and may be arranged to produce an initial steep ramp adapted to overcome drive train friction—this can prevent any perceivable delay in starting off from rest.

The initial steep ramp may continue up to a threshold voltage at which a less steep ramp is effected by continued demand for acceleration. Ramping up and down may be effected at different rates—ramping down may be effected at a faster rate than ramping up (except if appropriate, for ramping up at an initial steep rate).

After ramping down a motor shunt may be progressively brought into play to effect motor braking. On actuation of the switch to ramp up motor voltage any motor shunt applied may be immediately removed.

A pre-set run control may be provided operable to ramp the motor voltage up to a predetermined value for a predetermined time. More than one predetermined time may be available. The arrangement may comprise a push-button type actuator independent of the handle switch to control the feature; one depression of the actuator might give a run-on time of say ten seconds, a second depression within, say, one second, could give a run-on time of, say, twenty seconds. Such a pre-set run control may be arranged to be operable only when the motor voltage is not otherwise being ramped up.

A cruise control arrangement may be provided in which the instantaneous voltage applied to the motor can be maintained indefinitely. The cruise control may be arranged to be operative only when the motor voltage is being ramped up, thus when the trolley is accelerating under the control of the handle switch and has been thought to have attained a desired speed, the operating mode may be shifted into cruise so that the motor no longer responds to the handle switch. Again, a push-button type actuator may be used to select cruise mode, and, since cruise mode cannot be selected at the same time as pre-set run mode, the same push-button type actuator may be used for both controls, also to cancel cruise mode.

The control arrangement may comprise a microprocessor. The predetermined settings, e.g., of ramp rates, threshold voltage, pre-set run voltage and cruise speed, may be held in ROM having been specifically chosen to optimise performance of a particular trolley, or may be held in EEPROM with facility to change them, or some of them, according to user preference.

Motor current can, of course, be monitored for protection from short circuit or to switch off in case of out-of-limits operation—a collision, for example. A current limiting arrangement can be provided preventing too-rapid acceleration or limiting uphill speed to improve the efficiency of the battery discharge cycle and to limit motor operation to its maximum efficiency range.

The microprocessor can also monitor battery level and indicate charge remaining.

The invention also comprises a trolley comprising a control arrangement as referred to above. With the motor braking feature, the motor may drive a fixed wheel arrangement; if a pair of fixed wheels is driven a differential may be used.

Embodiments of a control arrangement and a trolley according to the invention will now be described with reference to the accompanying drawings.

BRIEF DESCRIPTION OF THE DRAWINGS

FIG. 4 is a diagrammatic illustration of a control circuit for the golf trolley;

FIG. 5A, 5B and 5C are graphs showing motor voltage against time in various operating modes;

DETAILED DESCRIPTION

Figure 1:
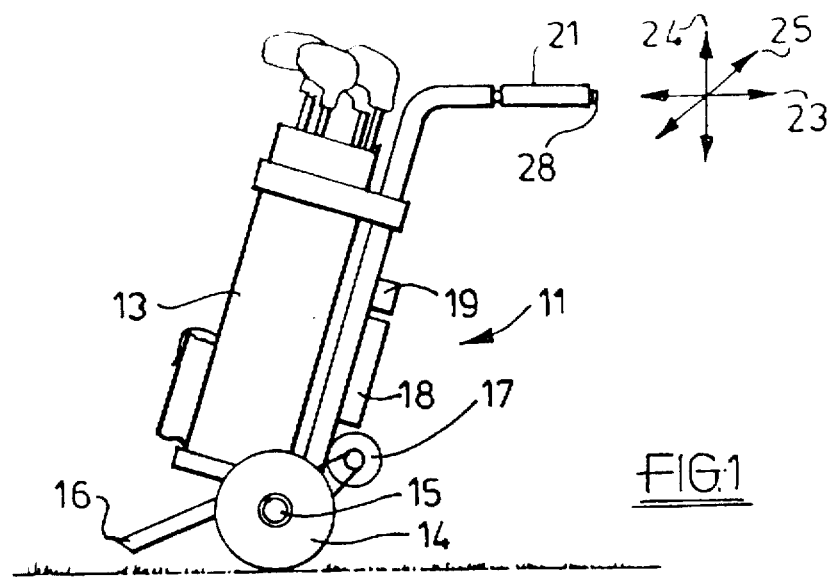
FIG. 1 is a side elevation of a motorised golf trolley.

Embodiments of a control arrangement for a motorised trolley are shown and described in connection with a motorised golf trolley 11 of the type shown in FIG. 1. The trolley has a frame 12 with accommodation for a golf bag 13 and runs on wheels 14 on an axle 15 which comprises two half shafts with a differential. A foot 16 allows the trolley 11 to stand up when not in motion. An electric motor 17 drives the wheels which in this case are fixed wheels, i.e., without free wheel gear. A battery 18 powers the motor 17 under the control of the control arrangement 19. Instead of the foot 16, which normally requires the trolley to be tilted for movement, a third (free) wheel can be provided, or the third wheel can be driven by the motor while the other two coaxial wheels are free running.

The trolley 11 has a handle 21 by which the motor 17 is controlled. The handle 21 works a transducer 22 providing control signaling for the motor 17 and having limited movement relative to the trolley 11 in the fore and aft direction, arrow 23, but is stiffly connected to the trolley in the vertical and lateral directions 24, 25.

When the handle 21 is pulled in the usual fashion for pulling along an unmotorised trolley, the transducer 22 provides control signaling for the motor 17 which drives the wheels 14 reducing or eliminating the pulling force required to move the trolley 11. Pitch and yaw control remains exactly as it is with unmotorised trolleys, the handle 21 being, for these movements, the equivalent of the conventional unmotorised trolley handle.

The handle 21 can, of course, simply be added on to or substituted for the existing handles of conventionally motorised trolleys to retrofit the control arrangement of the present invention.

Figure 2:
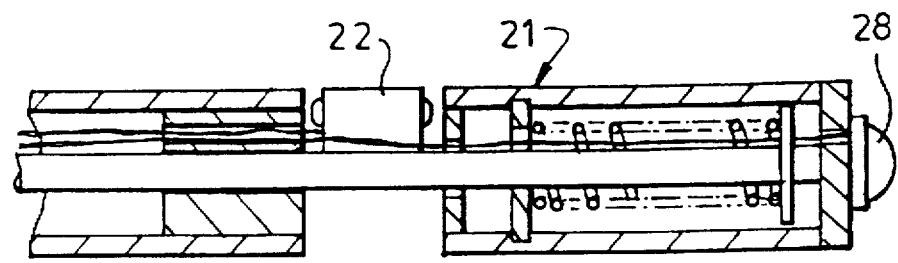
FIG. 2 is a cross-section through one embodiment of then handle of the trolley of FIG. 1.

The transducer 22, in the handle illustrated in FIG. 2, comprises a microswitch biassed to one of two (on/off) positions which on operation of the handle 21 to pull the trolley 11 along actuates the controller 19 to ramp up motor voltage in a predetermined fashion and when the microswitch returns under its bias to its position indicating lack of demand for further acceleration actuates the controller to hold the motor voltage for a predetermined time, then unless there is further demand, to ramp it down.

The "predetermined fashion" and "predetermined time" referred to depend on the circumstances.

If the trolley 11 is at rest, operation of the microswitch 22 first removes a motor shunt—as seen in FIG. 4, a rheostat 27 is connected across the motor 17 terminals and at rest the motor is shunted out with the slider at end "A". To remove the shunt, the slider is moved to end "B". (Of course, this can perhaps better be implemented with solid state switching in practice).

The initial ramp from rest is very steep as seen at R1 on FIG. 5A. This is adapted to overcome drive train friction and reduce or eliminate any apparent delay between pulling on the handle and the trolley starting forward.

This steep ramp—the slope of which can, of course, be selected at an appropriate value by trial on different types and weights of trolley—continues up to a threshold voltage $V_T$ at which a less steep ramp R2 is effected by continued demand for acceleration.

When the trolley 11 has accelerated to walking speed the pull on the handle 21 relaxes and the microswitch 22 returns under its bias. This maintains the voltage at the instantaneous level for a pre-set time and then ramps the voltage down with a slope R3 steeper than R2. In prolonged walking, the slight slowing down of the trolley 11 will cause the microswitch 22 again to actuate the ramping up and down in cycles as shown in FIG. 5A. Appropriate selection of ramping rates and the hold level time, depending on the type and weight of the trolley can reduce or eliminate "hunting" here.

Figure 3:
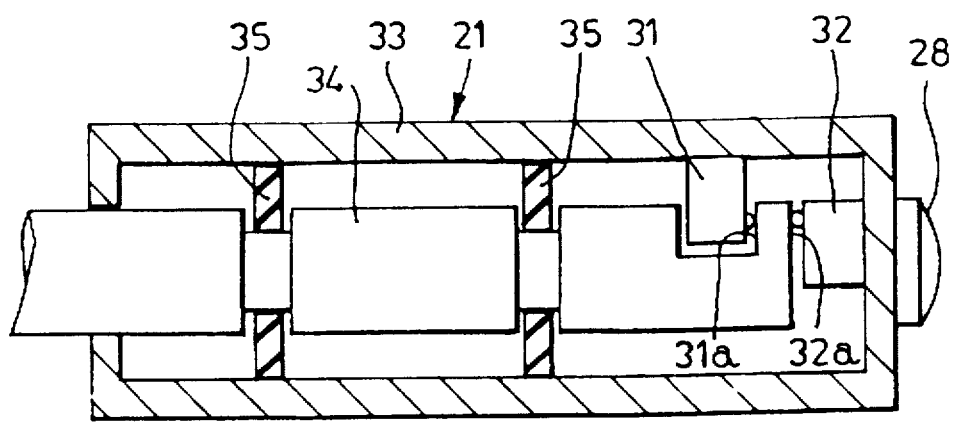
FIG. 3 is a cross-section through a second embodiment of the handle of the trolley of FIG. 1.

FIG. 3 illustrates a handle in which two opposed microswitches 31, 32 are used in a handle which effects appropriately directioned motor drive according as pulling or pushing the trolley is intended. The microswitches are fixed to the handle outer shell 33 and bear against faces 31a, 32a of an armature 34 fixed to the trolley 11. The outer shell is supported on the armature 34 by rubber suspension collars 35. The arrangement (as also with the embodiment of FIG. 2) is such that a light force in the appropriate direction will close the respective switch after slight movement, but that further force on the handle will not be taken by the switch mounting per se but rather by stiffness in the handle mounting or by abutment means.

After ramping down, the motor shunt can be progressively brought into play to effect motor braking—the use of motor braking implies, of course, the use of fixed rather than free wheels, hence the desirability of the differential in the drive train. Ramping down can be continued below zero volts so that enhanced motor braking can be used. The braking can be arranged to be regenerative so as to enhance range or time between battery charges.

If, of course, during a braking phase, the microswitch 22 is actuated to ramp up motor voltage again, indicating a demand for acceleration, the motor shunt is instantaneously removed.

The handle 21 has a second switch 28 which is a pushbutton type switch in the end of the handle 21. This can be operated independently of the switch 22 and has different operational modes depending on the circumstances in which it is operated.

If the switch 28 is operated when the motor voltage is not already being ramped up (e.g., from a standing start or during braking) it acts as a pre-set run control and it ramps the motor voltage up to a predetermined value $V_P$ and holds it for a predetermined time $T_P$ as shown in FIG. 5B. Two pushes on the button 28 can double this time—broken line trace shown in FIG. 5C. If the button 28 is pressed when the motor voltage is, under the pull or push control, greater than zero (otherwise than by actuation of the button 28) it acts as a cruise control in which the instantaneous voltage applied to the motor 17 is maintained indefinitely, until cancelled by another press on the button 28. This is seen in FIG. 5C, where the button 28 is pressed during an R2 ramp at time $T_C$ and again at $T_C+D$ where D is the cruise duration.

The controller 19 is based on a microprocessor 26 with either ROM or EEPROM 38 to hold the various parameters determining the ramp rates and timings. The microprocessor 26 can also be arranged to monitor battery charge level to indicate the same in red and green led's 29, 30, and motor current and to impose a limit on motor current and cut off the power in defined out-of-limits operating conditions. Reverse apparatus (i.e., both push or pull operations from a single switch as shown in FIG. 3) is illustrated diagrammatically by a change over switch 32 in FIG. 4—in practice, again, solid state switching under the control of the microprocessor 26 would be preferentially used, but the change over switch illustrates the intention. Implementation in programming of the microprocessor 26, of course, can give different drive characteristics according as the trolley 11 is pushed or pulled, should this be desired.

Figure 6:
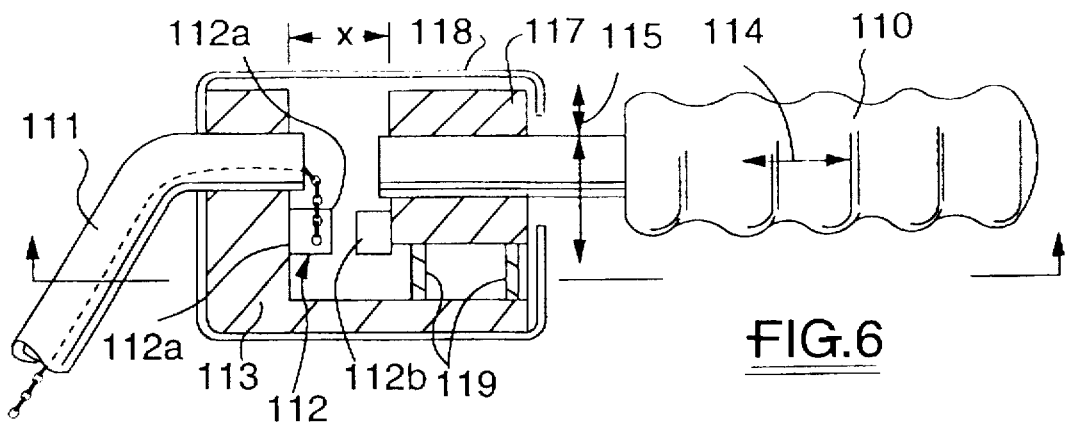
FIG. 6 is a cross-section through another embodiment of the handle of the golf trolley of FIG. 1.

An alternative embodiment 110 of a handle for the trolley 11 is shown in FIG. 6. The handle 110 works a transducer 112 providing a control signal for the driving motor 17.

The handle 110 is connected to the trolley 11 by a handle bar 111 to which is attached a bracket 113. The handle 110 has limited movement relative to the bracket 113 (and thus to the trolley) in the fore and aft direction, arrow 114, but is stiffly connected to the bracket 113 (and thus, also, to the trolley) in the vertical and lateral directions (arrows 115, 116) whereby the trolley can be manually controlled by the handle 110 in pitch and yaw. Pitch control is necessary, of course, for tilting the trolley off its leg and maintaining it at a comfortable attitude for travel, and yaw control is necessary for steering.

Absent the motor 17, or with it disconnected, the handle 110 could be used to haul the trolley exactly as a conventional unpowered trolley handle—the connection of the trolley is strong enough and rigid enough, even in the fore and aft direction for such unpowered operation.

The connection between the handle 110 and the bracket 113 is by parallel leaf springs 119 forming a parallelogram linkage between bracket 113 and a block 117.

Figure 7:
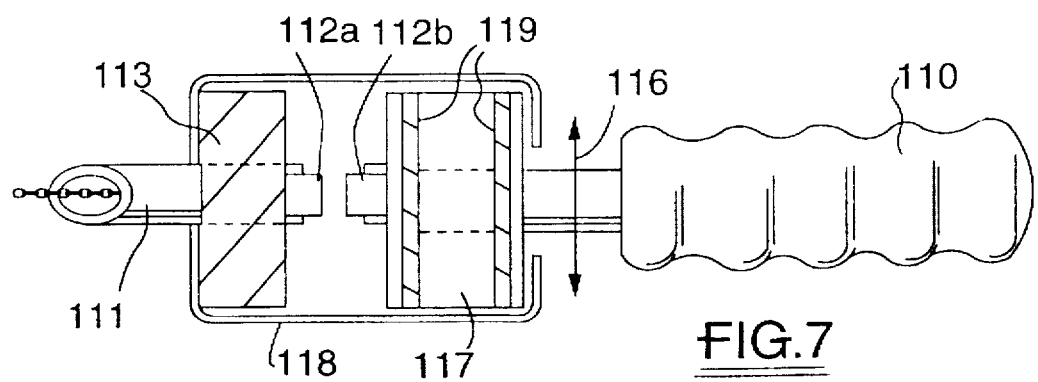
FIG. 7 is a section in the line 7—7 of FIG. 6.

The transducer 112 as illustrated in FIGS. 6 and 7 comprises a Hall effect device 112a on the bracket 113 and a magnet 112b on the block. In the control diagram of FIG. 8, however, the transducer is shown as a rheostat—in practice any kind of transducer which is robust enough and which will give a usable output representative of the separation between bracket 113 and block 117 can be used.

The arrangement is contained in a housing 118 with clearance around the handle 110 sufficient for the permitted movement.

Figure 8:
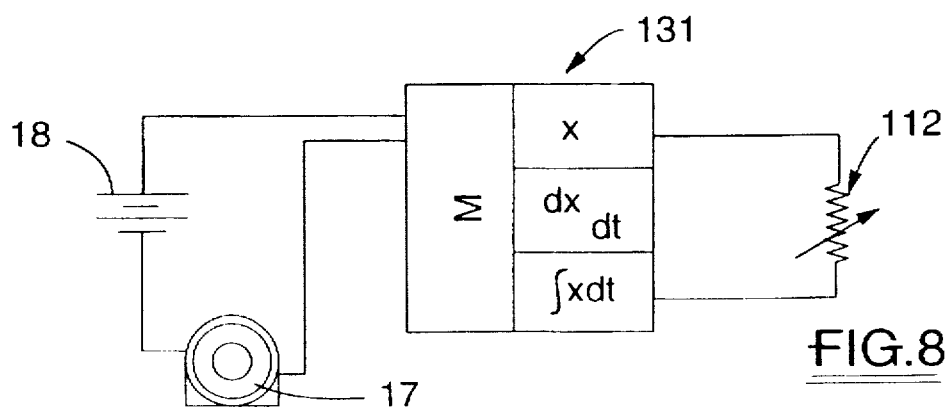
FIG. 8 is a diagrammatic representation of a control system for the golf trolley.

As seen in FIG. 8, the transducer 112 is connected in a control arrangement 131 for the motor 17 which has a differentiating unit generating a signal corresponding to the time derivative dx/dt of the spacing x between bracket 113 and block 117 and an integrating unit generating a time integral $\int x\, dt$ over a selected time of the distance x. A composite of x, dx/dt and $\int x\, dt$ is used to control the motor 17. The control arrangement 131 can be a digital electronic system or a hard-wired analogue system.

The arrangement can be realised as a retrofit for conventionally controlled powered trolleys—the housing 118 can simply be fixed to the end of an existing handlebar.

Figure 9:
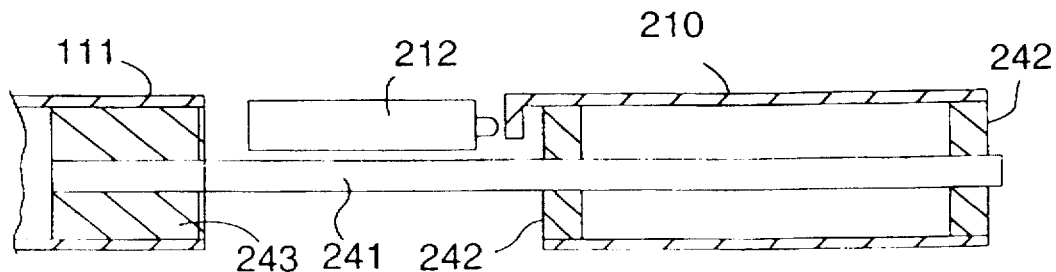
FIG. 9 is a cross section through another embodiment of the handle of the golf trolley of FIG. 1.

An alternative embodiment 210 of a handle for the trolley 11 is shown in FIG. 9.

The handle 210 comprises a tubular grip mounted on a shaft 241 by flexible mounts 242 which comprise elastic discs made of fabric reinforced elastomer. The shaft 241 is mounted in a plug 243 inserted in the end of a tubular bar or first part 111.

This arrangement is compliant in the axial direction of the handle 210, but very stiff in pitch and yaw (even when using non-reinforced discs 242).

A microswitch 212 forms the transducer in this embodiment and is connected to the microprocessor 26 which integrates the on/off pulses generated by fore-and-aft displacement of the grip 210.

While the arrangement has been described with particular reference to golf trolleys, it is clearly also more widely applicable.

Embodiments of the present invention have been shown and described with a degree of particularity. This description is not intended to necessarily limit the scope of the invention. The scope of the invention is defined by the following claims.

I claim:

1. A control arrangement for a trolley having a plurality of wheels, said trolley including a motor for driving at least one of said wheels, said control arrangement comprising:

a transducer supplying control signals;

a handle inflexibly attached to the trolley in both a vertical direction and a lateral direction to allow for manual pitch and yaw control of the trolley, and said handle flexibly attached to the trolley in a longitudinal direction to allow a predetermined amount of fore and aft movement of the handle relative to the trolley for actuation of the transducer; and a motor controller receiving control signals from the transducer and operative for controlling operation of the motor in response to the control signals.

2. A control arrangement according to claim 1, wherein the handle includes:

a first segment inflexibly attached to the trolley in each of the vertical, lateral and longitudinal directions; and a second segment flexibly attached to the first segment in the longitudinal direction to allow the predetermined amount of fore and aft movement of the second segment relative to the first segment for actuation of the transducer.

3. A control arrangement according to claim 2, wherein the handle further includes:

two parallel leaf springs connecting the first and second segments, said parallel leaf springs separated from one another in the longitudinal direction to provide the predetermined amount of fore and aft movement of the second segment relative to the first segment.

4. A control arrangement according to claim 2, wherein:

the first segment of the handle comprises an elongated shaft;

the second segment of the handle comprises a hand grip; and wherein the handle further includes:

flexible mounting means connecting the hand grip to a first end of the shaft, said flexible mounting means allowing the predetermined amount of fore and aft movement of the hand grip along the length of the shaft.

5. A control arrangement according to claim 4, wherein the flexible mounting means comprises a plurality of elastic discs, each said disc having a central opening through which the shaft is inserted, and each disc having an outer circumference attached to an inner surface of the hand grip, said plurality of elastic discs separated from one another in the longitudinal direction.

6. A control arrangement according to claim 5, wherein said elastic discs are formed from a fabric reinforced elastomer material.

7. A control arrangement according to claim 4, wherein the trolley includes a handle bar for connecting the handle to the trolley, said handle bar including a cylindrical tube having an open end, and said handle further including:

a plug fixedly attached to a second end of the shaft opposite the hand grip, said plug adapted to be inserted into the open end of the handle bar to fix the shaft to the handle bar and prevent movement of the shaft relative to the trolley in any of the vertical, lateral and longitudinal directions.

8. A control arrangement according to claim 2, wherein:

the transducer comprises a Hall effect device attached to the first segment of the handle and a magnet attached to the second segment of the handle.

9. A control arrangement according to claim 1, wherein the transducer comprises a rheostat.

10. A control arrangement according to claim 1, wherein:

the transducer comprises a microswitch; and the handle moves in the longitudinal direction between a first position where the microswitch is open and a second position where the microswitch is closed to provide electric pulses as output affording said control signal.

11. A control arrangement according to claim 1, wherein the transducer comprises a Hall effect device and a magnet.

12. A control arrangement according to claim 11, in which said motor controller controls the operation of the motor in a proportional relationship to the control signals from the transducer.

13. A control arrangement according to claim 11, in which said motor controller controls the operation of the motor based on an integral relationship of the control signals from the transducer in relation to time.

14. A control arrangement according to claim 2, wherein:

the trolley further includes a battery having a voltage supplied by the motor controller to the motor;

the first segment is proximally attached to the trolley;

the second segment is distal to the first segment and is movable between predetermined first and second longitudinally displaced positions relative to the first segment;

the transducer comprises a switch operative to deliver a first control signal upon movement of the second segment to the first predetermined longitudinal position to pull the trolley along and further operative to deliver a second control signal upon movement of the second segment to the second predetermined longitudinal position to indicate a lack of demand for further acceleration of the trolley;

the motor controller responds to the first control signal to ramp up the voltage supplied to the motor in a first predetermined manner; and the motor controller responds to the second control signal to ramp down the voltage supplied to the motor in a second predetermined manner.

15. A control arrangement according to claim 14, wherein:

the motor controller responds to the first control signal when the trolley is at rest to first remove a motor shunt.

16. A control arrangement according to claim 14, wherein:

the motor controller responds to the first signal to initiate movement of the trolley from an at rest position to produce an initial steep ramp up of voltage supplied to the motor to overcome drive train friction.

17. A control arrangement according to claim 16, wherein:

the motor controller ramps down the voltage supplied to the motor at a faster rate than all ramping up of the voltage supplied to the motor except the initial steep ramp up of voltage supplied to the motor.

18. A control arrangement according to claim 16, wherein:

the motor controller continues the initial steep ramp of voltage up to a predetermined threshold voltage and upon reaching the predetermined threshold voltage continues the ramp up of voltage at a less steep ramp upon continued demand for acceleration.

19. A control arrangement according to claim 14, wherein:

the motor controller effects ramping up and ramping down of the voltage supplied to the motor at different rates.

20. A control arrangement according to claim 19, wherein:

the motor controller progressively brings a motor shunt into play to effect motor braking during ramping down.

21. A control arrangement according to claim 20, wherein:

the motor controller responds to the first signal to ramp up motor voltage by immediately removing any motor shunt previously applied.

22. A control arrangement according to claim 14, wherein:

the motor controller ramps the motor voltage up to a predetermined value for a predetermined time to create pre-set run control.

23. A control arrangement according to claim 22, wherein:

the motor controller maintains the motor voltage at said predetermined value for a time interval equal to multiples of said predetermined time.

24. A control arrangement according to claim 22, further comprising:

a push-button type actuator independent of the transducer switch for signaling the motor controller to execute the pre-set run control.

25. A control arrangement according to claim 22, wherein:

the motor controller executes the pre-set run control only when the motor voltage is not being otherwise ramped up.

26. A control arrangement according to claim 1, wherein:

the trolley further includes a battery having a voltage supplied by the motor controller to the motor; and the motor controller executes a cruise control operation in which an instantaneous voltage applied to the motor is maintained until terminated.

27. A control arrangement according to claim 26, wherein:

the motor controller executes the cruise control operation only after the voltage supplied to the motor is ramped up in a predetermined fashion.

28. A control arrangement according to claim 27, further comprising:

a push-button type actuator independent of the transducer for signaling the motor controller to execute the cruise control operation.

29. A control arrangement according to claim 1, wherein the motor controller further comprises:

a microprocessor and ROM connected to the microprocessor, wherein predetermined information for controlling motor operation is stored in the ROM, said predetermined information being selected for controlling motor operation in accordance with the control signals.

30. A control arrangement according to claim 29, in which the ROM comprises EEPROM.

31. A control arrangement according to claim 29, wherein the motor controller is adapted to drive a fixed wheel of the trolley.

32. A control arrangement according to claim 29, wherein the motor controller is adapted to drive a pair of fixed wheels by controlling a differential of the trolley.

\* \* \* \* \*